United States Patent
St. Pierre

(10) Patent No.: US 6,208,196 B1
(45) Date of Patent: Mar. 27, 2001

(54) CURRENT MODE CHARGE PUMPS

(75) Inventor: Robert St. Pierre, Tucson, AZ (US)

(73) Assignees: Maxim Integrated Products, Inc., Sunnyvale, CA (US); Gain Technology.Corporation, Tucson, AZ (US)

(*) Notice: Subject to any disclaimer, the term of this patent is extended or adjusted under 35 U.S.C. 154(b) by 0 days.

(21) Appl. No.: 09/261,070

(22) Filed: Mar. 2, 1999

(51) Int. Cl.$^7$ .................................................. G05F 1/10
(52) U.S. Cl. .................................... 327/536; 363/60
(58) Field of Search .................................. 327/536, 589, 327/390, 537; 363/60

(56) References Cited

U.S. PATENT DOCUMENTS

| | | | |
|---|---|---|---|
| 4,271,461 | 6/1981 | Hoffmann et al. | 363/60 |
| 4,922,128 | * 5/1990 | Dhong et al. | 307/269 |
| 5,126,590 | * 6/1992 | Chern | 327/536 |
| 5,162,668 | 11/1992 | Chih-Liang et al. | 307/296.8 |
| 5,252,865 | * 10/1993 | Davenport et al. | 307/514 |
| 5,267,201 | 11/1993 | Foss et al. | 365/189.09 |
| 5,625,315 | * 4/1997 | Matsui et al. | 327/536 |
| 6,021,056 | * 2/2000 | Forbes et al. | 363/60 |
| 6,046,625 | * 4/2000 | Menichelli | 327/536 |

FOREIGN PATENT DOCUMENTS 2294584 7/1976 (FR).

* cited by examiner

Primary Examiner—Jung Ho Kim
(74) Attorney, Agent, or Firm—Blakely, Sokoloff, Taylor & Zafman LLP

(57) ABSTRACT

Current mode charge pumps having improved power consumption characteristics and reduced peak current requirements. The current mode charge pumps utilize a differential transistor pair with a current source providing the tail current for the differential pair. The differential pair alternately steers the current of the current source through first and second fly capacitors, with additional circuitry coupling the opposite fly capacitor, previously charged, to the output of the charge pump. Selection of the tail current provides for matching of circuit performance with the required charge pump output voltage, the load current to be provided thereby and the start time requirements.

18 Claims, 2 Drawing Sheets

CURRENT MODE CHARGE PUMPS

BACKGROUND OF THE INVENTION

1. Field of the Invention

The present invention relates to the field of charge pumps.

2. Prior Art

Charge pumps are well known in the prior art for operating from a power supply of a first voltage for such purposes as providing a source of power at a second voltage higher than the first voltage (voltage multiplication), and/or providing a balanced (plus and minus) power supply from a single power supply (voltage inversion). Such charge pumps are often realized in integrated circuit form and the output thereof used for various purposes on that integrated circuit. By way of a specific example, the preferred embodiment of the present invention is intended for use in CMOS integrated circuits to provide an augmented dual supply to achieve rail-to-rail input and rail-to-rail output voltages for on chip integrated circuits.

A typical circuit for a prior art voltage mode charge pump may be seen in FIG. 1. As shown in that Figure, fly capacitors $C_1$ and $C_2$ are driven by a clock signal CLK through inverters INV1, INV2 and INV3. The inverters are shown schematically, in that the output of the inverters INV1 and INV2 are non-overlapping signals representing the inverted clock signal CLK and the non-inverted clock signal, respectively. When the output of inverter INV1 is high and the output of inverter INV2 is low, the charge on capacitor $C_1$ will drive the voltage on node 1 higher than the supply voltage $V_{DD}$. This turns off n-channel transistor M1, and turns on n-channel transistor M2 to charge capacitor $C_2$ to the power supply voltage $V_{DD}$ (the output of inverter INV2 being low, typically at ground potential). At the same time node 1, being driven higher than the power supply $V_{DD}$, will hold p-channel device M4 off. The low voltage on node 2, however, will turn on p-channel device M3 to couple the higher voltage at node 1 to the output $V_{OUT}$, delivering charge to the reserve capacitor $C_{OUT}$ in an amount dependent upon the value of the output voltage $V_{OUT}$, the current being drawn by the load connected to the output $V_{OUT}$ and the various other parameters of the charge pump.

When the output of the inverter INV1 goes low and the output of inverter INV2 goes high, the voltage on node 2 will now go higher than the supply voltage $V_{DD}$ because of the charge on capacitor $C_2$, turning on n-channel transistor M1 to recharge capacitor $C_1$ to the voltage $V_{DD}$. The voltage on node 1 will turn on p-channel device M4 to couple the higher voltage on node 2 to the output $V_{OUT}$, delivering charge from fly capacitor $C_2$ to the reserve capacitor $C_{OUT}$. Note that even if the voltage on node 1 is equal to $V_{DD}$, as it would be when capacitor $C_1$ is fully charged, the voltage on node 2 when the output of inverter INV2 is high, and the output voltage $V_{OUT}$, will both be higher than the voltage $V_{DD}$, so that both the source and drain of p-channel device M4 will be at higher voltages than the gate of the device. With no significant load on the output of the charge pump, the output voltage $V_{OUT}$ will stabilize at approximately 2 $V_{DD}$.

In the foregoing circuit, the power consumption is not well controlled due to switching losses, namely the feed through current in inverters INV1, INV2 and INV3. Also the excess current required to charge and discharge the capacitors due to the switching times.

BRIEF SUMMARY OF THE INVENTION

Current mode charge pumps having improved power consumption characteristics and reduced peak current requirements. The current mode charge pumps utilize a differential transistor pair with a current source providing the tail current for the differential pair. The differential pair alternately steers the current of the current source through first and second fly capacitors, with additional circuitry coupling the opposite fly capacitor, previously charged, to the output of the charge pump. Selection of the tail current provides for matching of circuit performance with the required charge pump output voltage, the load current to be provided thereby and the start time requirements. Various embodiments are disclosed.

DETAILED DESCRIPTION OF THE INVENTION

Figure 1:
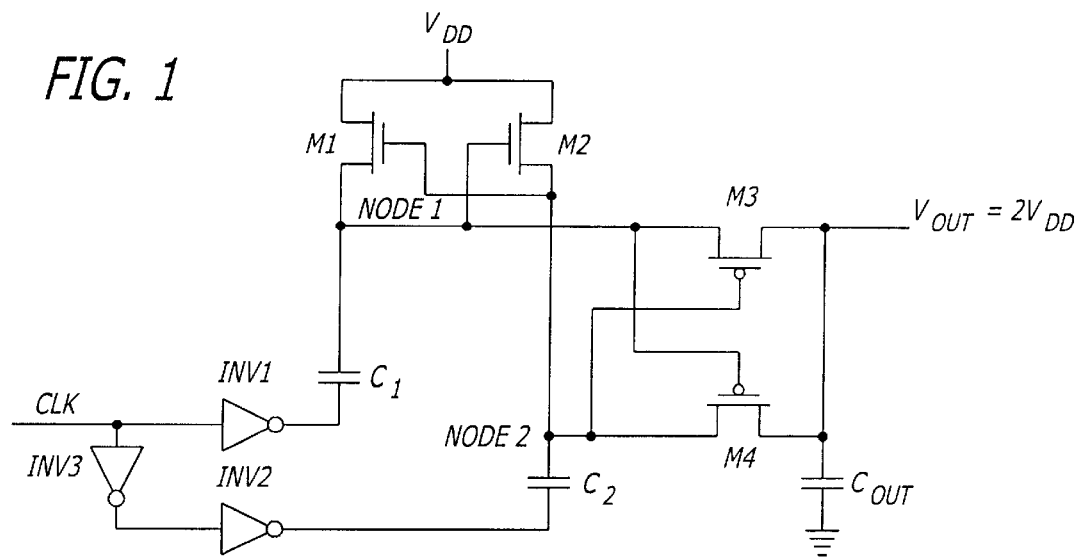
FIG. 1 is a circuit diagram of a prior art voltage mode charge pump.
Figure 2:
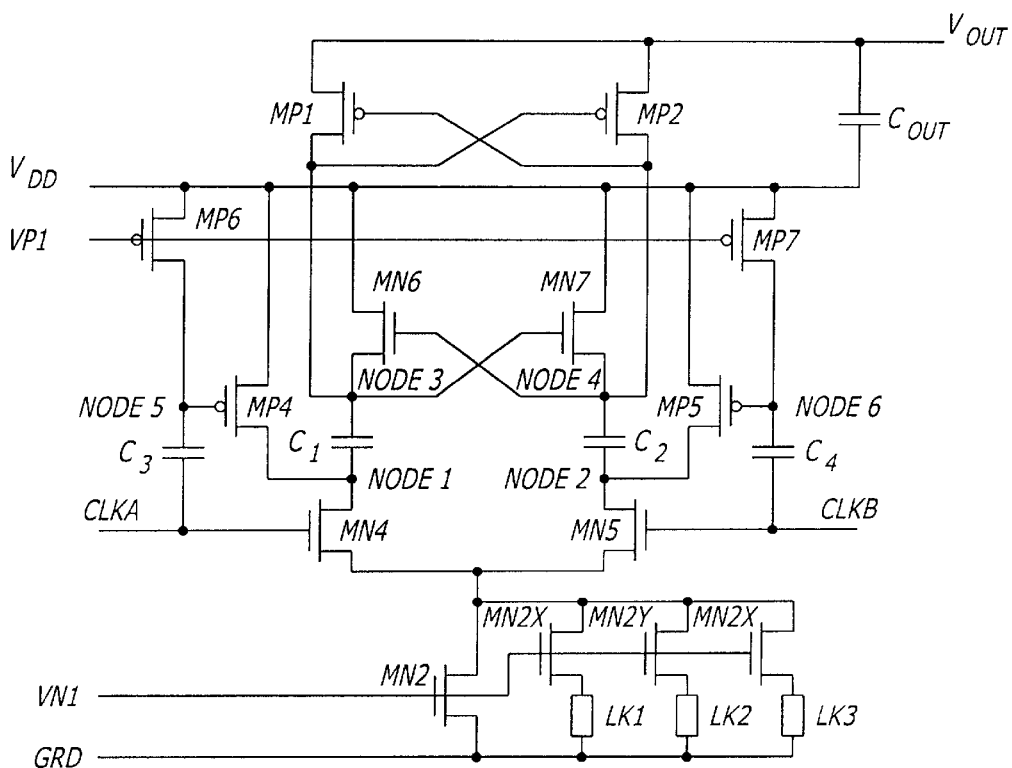
FIG. 2 is a circuit diagram for an exemplary current mode charge pump in accordance with the present invention as used for a voltage multiplier.

Now referring to FIG. 2, a preferred embodiment of the present invention may be seen. In this Figure, the fly capacitors $C_1$ and $C_2$, as well as the reserve capacitor $C_{OUT}$, are labeled as in FIG. 1, as their primary functions are the same as in the prior art circuit. Also in FIG. 2, while the main power supply lines are labeled $V_{DD}$ for the positive supply voltage, and GRD for ground (which alternatively could be any first and second voltages), two additional inputs other than the clocking signals are provided to the circuit, namely voltages VN1 and VP1. These voltages are gate voltages typically mirrored from another MOS device having a predetermined current there through, so that the devices having their gates referenced to these voltages will have the same or proportionate current there through when biased into conduction. Thus, n-channel devices MN2, MN2X, MN2Y and MN2Z act as current sources, as generally do p-channel MOS devices MP6 and MP7 when biased into forward conduction.

In the circuit shown in FIG. 2, n-channel devices MN4 and MN5 are coupled as a differential pair having a tail current determined by the n-channel devices MN2, MN2X, MN2Y and MN2Z. These last three n-channel devices (MN2X, MN2Y and MN2Z) are trim devices, in that all three may be used to contribute a component to the total tail current of the differential pair, or alternatively any one, two or all three of such devices may be taken out of circuit by opening one, two or all three links LK1, LK2 and LK3 at the time of wafer sort to trim the tail current to the desired level, irrespective of process variations and/or for different applications. In the preferred embodiment, all four transistors MN2, MN2X, MN2Y and MN2Z are the same size, though different sizes and/or different numbers of transistors may be used, such as by way of example, a binary progression of transistor widths might be used, if desired, for greater trimming adjustment accuracy.

In the circuit of FIG. 2, n-channel devices MN6 and MN7 are high voltage, high threshold devices. Also p-channel devices MP6 and MP7 provide a current to charge capacitors $C_3$ and $C_4$, which couple the voltage changes on the non-overlapping clock inputs CLKA and CLKB, respectively, to the gates of p-channel transistors MP4 and MP5, respectively, to turn the same off when the respective clock signal is high and to turn the same on when the respective clock signal is low.

In operation, when clock signal CLKA is high and the opposite clock signal CLKB is low, devices MN4 and MP5 will be turned on and devices MN5 and MP4 will be turned off. This connects node 1 to the source of tail current (devices MN2, etc.) through device MN4, with device MP5 pulling node 2 to the power supply voltage $V_{DD}$. At this time, node 4 will be pushed above voltage $V_{DD}$ by the voltage on capacitor $C_2$, turning device MN6 on so that capacitor $C_1$ will charge at a rate set by the tail current for the differential pair MN4, MN5. Because device MN6 is on, node 3 will be at voltage $V_{DD}$, holding device MN7 off to allow node 4 to go above $V_{DD}$ as previously described. With node 4 approaching $V_{OUT}$, device MP1 will be off, and the low voltage on node 3 (device MN4 being on) will turn on device MP2 to couple the fly capacitor $C_2$ to the output $V_{OUT}$. Thus devices MP5 and MP2 will be on, and capacitor $C_2$ will be coupled in parallel with the reserve capacitor $C_{OUT}$.

When CLKA goes low and CLKB goes high, devices MN5, MP4, MN7 and MP1 turn on, and devices MN4, MP5, MN6 and MP2 turn off to couple now charged fly capacitor $C_1$ between $V_{DD}$ and the output $V_{OUT}$ in parallel with $C_{OUT}$ and to couple fly capacitor $C_2$ between $V_{DD}$ and ground through the current source for recharging for the next charge pump cycle.

Figure 3:
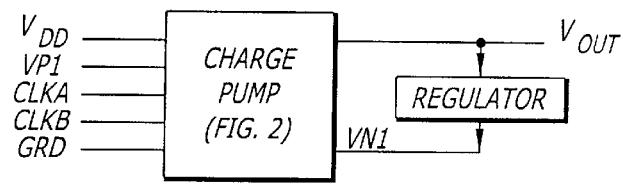
FIG. 3 is a block diagram illustrating the regulation of tail current for a charge pump of the type illustrated in the circuit of FIG. 2 to minimize power requirements while providing a short startup time.

In the charge pump circuit of FIG. 2, the output voltage $V_{OUT}$ will be approximately 2 $V_{DD}$, dependent on the clock frequency, tail current and ratio between $C_1$, $C_2$ and $C_{OUT}$. The tail current supplied to the differential pair MN4, MN5 may be selected to just provide the necessary load current at the desired output voltage, thereby minimizing the output ripple, though unless the tail current is significantly higher than this, at least during startup, the startup time could be excessive for some applications. Also, it can be shown that increasing the tail current tends to increase power consumption, and tends to increase the ripple in the output voltage $V_{OUT}$. As an alternative, the tail current could be made variable, such as one value for startup and one for steady state operation, or alternatively, could be controlled by feedback to provide fast startup and to regulate the charge pump output during steady state operation. Such a system is shown in block diagram form in FIG. 3.

Figure 4:
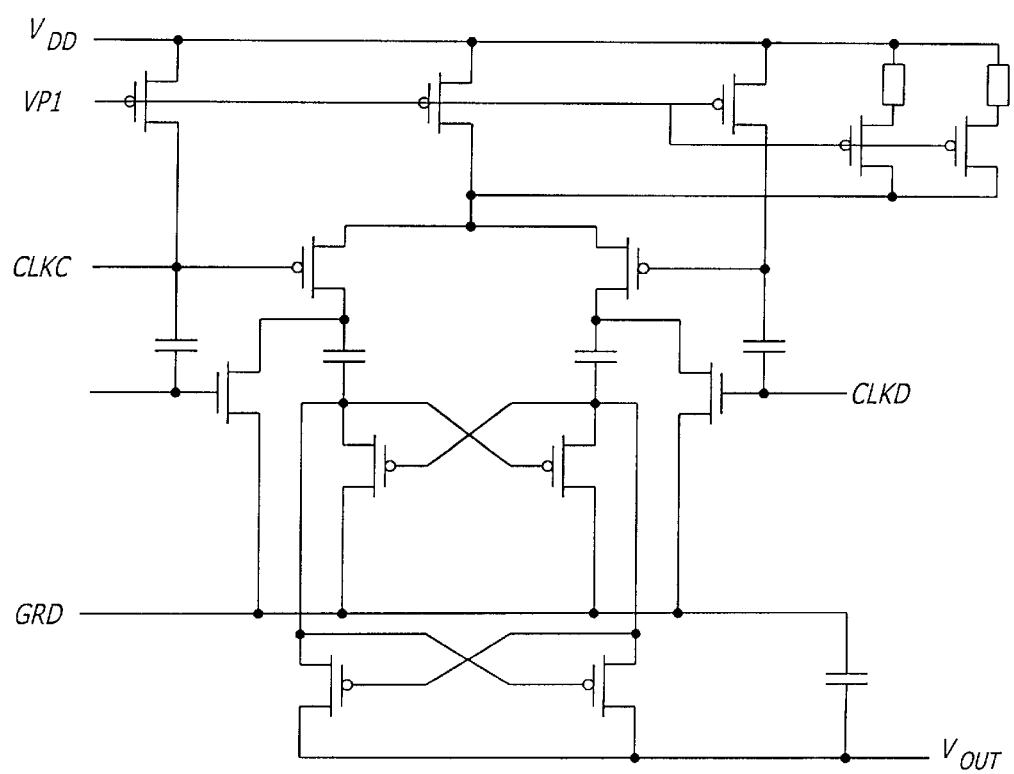
FIG. 4 is a circuit diagram for an exemplary current mode charge pump in accordance with the present invention as used for voltage inversion.

In the exemplary embodiment disclosed and described herein, the charge pump is shown operating between the two power supply voltages $V_{DD}$ and ground, though these two voltages are intended to merely be representative of first and second voltages generally. Similarly, the output of the charge pump $V_{OUT}$ is a voltage above $V_{DD}$, though other output voltages such as voltages lower than the first and higher than the second voltages may also be obtained if desired (dual supply). By way of one specific example, as shown in FIG. 4, if all transistors are changed to the opposite conductivity type, the $V_{DD}$ connection is coupled to ground and the ground connection is coupled to $V_{DD}$, the output voltage $V_{OUT}$ will be a voltage lower than either the first or second voltages (lower than ground and $V_{DD}$, or a negative voltage in this example). Also, the charge pumps, plus or negative or both, may be cascaded to provide charge pumps capable of delivering voltages exceeding the output voltage limits for a single stage charge pump, for those application requiring still higher output voltages. Also, while the exemplary embodiments disclosed are disclosed in the form of CMOS circuits, other transistor forms may also be used, such as junction transistors if desired. Also alternatively, transistors MP4 and MP5 could have their respective gates separately driven, or driven through other circuitry if desired. Thus, various preferred and alternate embodiments of the present invention have been disclosed and described herein in detail as exemplary only and not for purposes of limitation, as various changes in form and detail will be obvious to those skilled in the art, and may readily be applied to the present invention without departing from the spirit and scope of the invention.

What is claimed is:

1. A charge pump comprising:

first and second power supply lines;

a current source coupled to the first power supply line;

first and second fly capacitors;

first and second transistors forming a differential pair, each of the first and second transistors being coupled to the current source and a respective one of the first and second fly capacitors at first and second nodes respectively, the first and second transistors alternately steering the current source current to the first and second fly capacitors;

first and second rectifying devices coupled to the first and second fly capacitors at third and fourth nodes, and to the second power supply line, respectively, the first and second rectifying devices allowing current flow in a direction to charge the fly capacitors by a voltage difference between the first and second power supply lines and blocking current flow in the opposite direction;

third and fourth rectifying devices coupling the third and fourth nodes to a charge pump output line, respectively, the third and fourth rectifying devices allowing current flow in a direction to discharge the fly capacitors by a voltage difference between the second power supply line and the charge pump output line and blocking current flow in the opposite direction; and, third and fourth transistors coupled between the first and second nodes and the second power supply line, the third and fourth transistors coupling the first and second nodes to the second power supply line when the second and first transistors couple the current source to the second and first fly capacitors, respectively.

2. The charge pump of claim 1 wherein the first and second rectifying devices are fifth and sixth transistors, respectively, the fifth and sixth transistors being coupled to be on when the first and second transistors are on respectively, and to be off when the third and fourth transistors are on, respectively.

3. The charge pump of claim 1 wherein the third and fourth rectifying devices are seventh and eighth transistors, respectively, the seventh and eighth transistors being coupled to be on when the third and fourth transistors are on respectively, and to be off when the first and second transistors are on, respectively.

4. The charge pump of claim 1 wherein the first and second rectifying devices are fifth and sixth transistors, respectively, the fifth and sixth transistors being coupled to be on when the first and second transistors are on respectively, and to be off when the third and fourth transistors are on, respectively, and wherein the third and fourth rectifying devices are seventh and eighth transistors, respectively, the seventh and eighth transistors being coupled to be on when the third and fourth transistors are on respectively, and to be off when the first and second transistors are on, respectively.

5. The charge pump of claim 1 further comprised of a feedback circuit coupled between the charge pump output line and the current source, the feedback circuit controlling the current source to regulate the charge pump output.

6. The charge pump of claim 4 wherein the transistors are MOS devices.

7. The charge pump of claim 6 wherein the fifth and sixth transistors are depletion mode transistors and the rest of the transistors are enhancement mode transistors.

8. The charge pump of claim 1 wherein the transistors are MOS devices.

9. In a charge pump wherein first and second fly capacitors are alternatively coupled to first and second voltages, an improvement comprising:

a current source coupled to the first voltage;

first and second transistors forming a differential pair, each transistor of the differential pair being coupled between the current source and a respective one of the fly capacitors, wherein the first and second transistors are MOS devices of a first conductivity type; and third and fourth transistors of a second conductivity type, each transistor being controlled by a respective transistor gate, first and second current sources and first and second coupling capacitors, the gates of the first and third transistors being coupled together, and coupled to the second voltage through the first current source, the gates of the second and fourth transistors being coupled together, and coupled to the second voltage through the second current source, wherein during a first phase of a clock signal driving said gates of said first and third transistors, the first transistor is turned on to couple said current source to respective fly capacitor to charge it, and during a second phase of said clock signal, the first current source turns on said third transistor to couple said first voltage to said respective fly capacitor to maintain an output voltage above said first voltage, and wherein during said second phase of said clock signal driving said gates of said second and fourth transistors, the second transistor is turned on to couple said current source to respective fly capacitor to charge it, and during said first phase of said clock signal, the second current source turns on said third transistor to couple said second voltage to said respective fly capacitor to maintain said output voltage above said second voltage.

10. The improvement of claim 9 wherein the gate of the first and third transistors are coupled together through a capacitor, and coupled to the second voltage through the first current source, and the gate of the second and fourth transistors are coupled together through a capacitor, and coupled to the second voltage through the second current source.

11. A charge pump, comprising:

a current source;

a first capacitor;

a second capacitor;

a first switching mechanism to alternately couple said current source to said first and second capacitors to cause their respective charging; and a second switching mechanism to alternately couple said charged first and second capacitors to an output capacitor to produce an output voltage.

12. The charge pump of claim 11, further comprising a third switching mechanism to alternatively couple a voltage to said charged first and second capacitors, wherein said output voltage is a function of said voltage and the charges on respective first and second capacitors.

13. The charge pump of claim 11, wherein said first switching mechanism comprises a differential pair of transistors.

14. The charge pump of claim 13, wherein said differential pair of transistors are respectively driven by clock signals having opposite phases to cause the alternately coupling of said current source to said first and second capacitors.

15. The charge pump of claim 14, wherein said differential pair of transistors comprise respective field effect transistors.

16. The charge pump of claim 11, wherein said second switching mechanism comprises a first and second transistors, wherein said first transistor is driven by a clock signal to couple said second fly capacitor to said output capacitor during a first phase of said clock signal, and wherein said second transistor is driven by said clock signal to couple said first fly capacitor to said output capacitor during a second phase of said clock signal.

17. The charge pump of claim 16, wherein said first and second transistors comprise respective field effect transistors.

18. The charge pump of claim 11, wherein said second switching mechanism alternately couples in parallel said first and second capacitors with said output capacitor.

* * * * *